April 23, 1968
N. H. BOGIE
3,379,456
TRAILER STABILIZER
Filed July 13, 1967
2 Sheets-Sheet 1
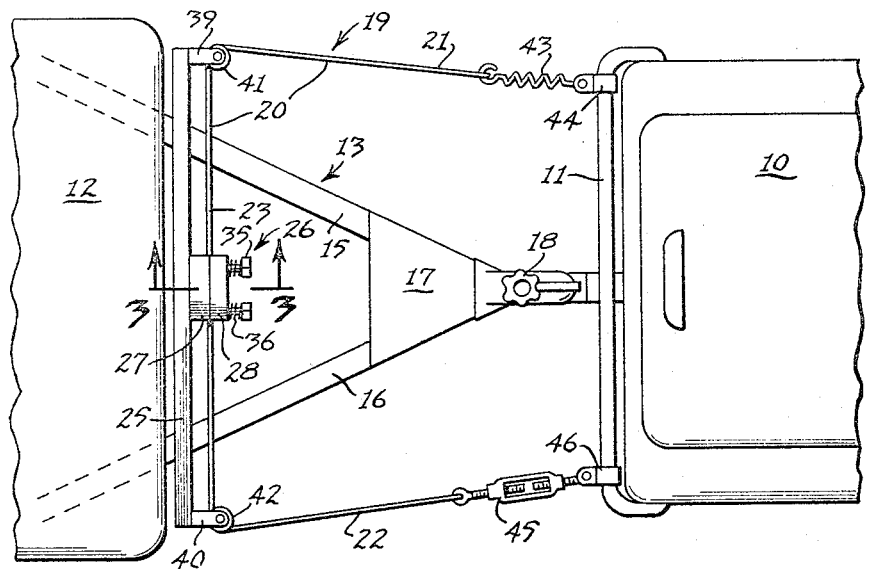
Fig. 1
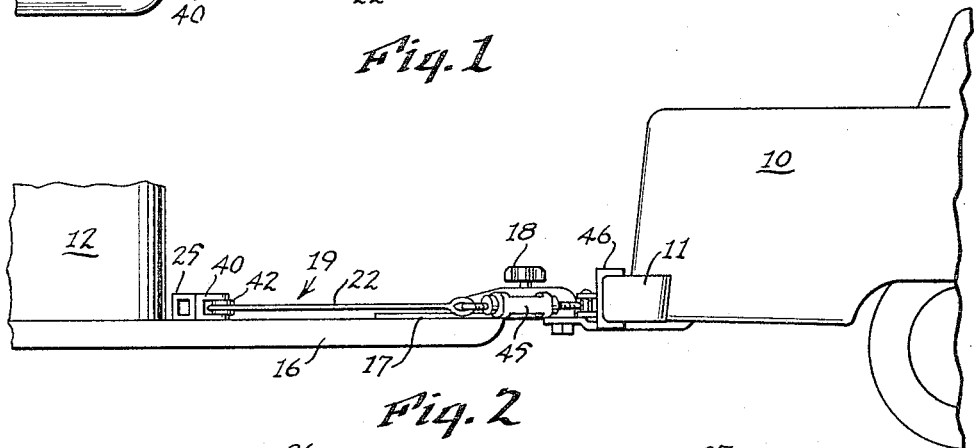
Fig. 2
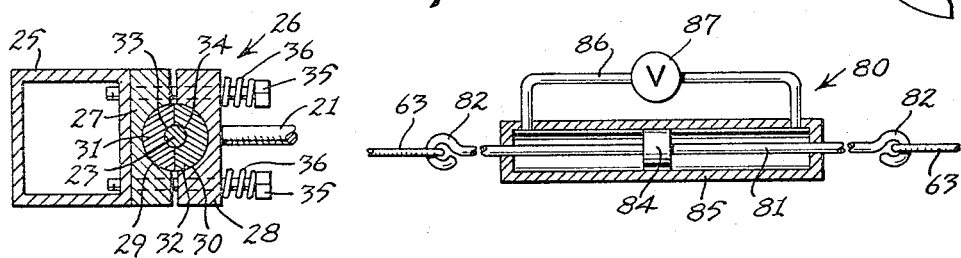
Fig. 3
Fig. 4
INVENTOR:
*NELSON HARVEY BOGIE*
BY
*Harrington A. Lackey*
ATTORNEY April 23, 1968 — N. H. BOGIE — 3,379,456
TRAILER STABILIZER
Filed July 13, 1967 — 2 Sheets-Sheet 2

INVENTOR:
NELSON HARVEY BOGIE
BY
Harrington A. Lackey
ATTORNEY

United States Patent Office 3,379,456
Patented Apr. 23, 1968

3,379,456
TRAILER STABILIZER
Nelson H. Bogie, Gilbertsville, Ky. 42044
Filed July 13, 1967, Ser. No. 653,220
4 Claims. (Cl. 280—446)

ABSTRACT OF THE DISCLOSURE

A trailer stabilizer including a flexible cable, the free ends of which are attached to one of the vehicles in a tractor-trailer vehicle tandem, a cable support mounted on the other vehicle including a cable retarding mechanism for resisting the longitudinal movement of the intermediate portion of the cable in either direction, and guide means mounted on the cable support to guide the cable from the retarding mechanism along opposite sides of and between the vehicles.

Background of the invention

This invention relates to a trailer stabilizer, and more particularly to a device for stabilizing a trailer drawn by a tractor vehicle, as well as permitting turning of the tractor vehicle relative to the trailer.

This trailer stabilizer is an improvement over the trailer stabilizer disclosed in the co-pending application of Nelson H. Bogie, S.N. 503,263, filed Oct. 23, 1965, and now Patent No. 3,338,595. In this co-pending application, a spool or drum is rotatably mounted on the cable support and a frictional mechanism cooperates with the spool to resist the rotation of the spool in either direction. The intermediate portion of a flexible cable is wound about the spool and the outer end portions, or right and left sections, of the cable are guided about cable guides at opposite ends of the cable support so that the right and left sections of the cable extend along opposite sides of the vehicles and are connected to the vehicle opposing the vehicle supporting the cable support.

Although the rotation of the spool may be resisted by the frictional mechanism, such as a plurality of adjacent brake discs, engaging each other and the spool, nevertheless the cable itself could slip about the spool, depending upon the number of cable turns around the spool, the tension in the cable and the pressure exerted between the friction discs and the spool. Moreover, in assembling the device or replacing a worn or broken cable, the old cable must be unwound and the new cable rewound about the spool. Moreover, obtaining the exact length of the cable for the device requires the computation of the circumference of the spool in addition to the longitudinal span of the cable from one end to the other between the vehicles.

Summary of the invention

It is therefore an object of this invention to provide a trailer stabilizer which is an improvement over prior trailer stabilizer devices, and particularly the one described in the above co-pending application, for certain purposes.

The trailer stabilizer made in accordance with this invention includes a cable retarding mechanism mounted on the cable support for receiving and engaging the intermediate portion of the cable, the end portions of which are guided about cable supports, such as pulleys and extended substantially parallel along the opposite sides of the vehicles. The cable retarding mechanism contemplated by this invention may be a mechanical device, such as a pair of opposed clamp jaws for directly engaging the surface of the intermediate portion of the cable, or it may be a pneumatic device in which an elongated portion of the intermediate section of the cable may be a rigid piston rod supporting a piston with a pneumatic cylinder. In either type of cable retarding mechanism, the resistance to the longitudinal movement of the cable in either direction is obtained by application of the retarding force directly to the intermediate cable section.

Furthermore, the cable retarding mechanism can be applied to the cable without the necessity of winding or unwinding the cable.

Another object of this invention is to provide in a trailer stabilizer a cable retarding mechanism in which the cable itself is directly controlled by the retarding forces.

A further object of this invention is to provide a cable retarding mechanism incorporating adjustment means for varying the degree of resistance applied to the longitudinal movement of the cable.

Brief description of the drawings

FIG. 1 is a plan view of the trailer stabilizer in operative position connecting a tractor vehicle and trailer, shown fragmentarily;

FIG. 2 is a side elevation of the invention disclosed in FIG. 1;

FIG. 3 is an enlarged section taken along the line 3—3 of FIG. 1;

FIG. 4 is an enlarged elongated sectional view of a modified cable retarding mechanism.

Description of the preferred embodiment

Figure 5:
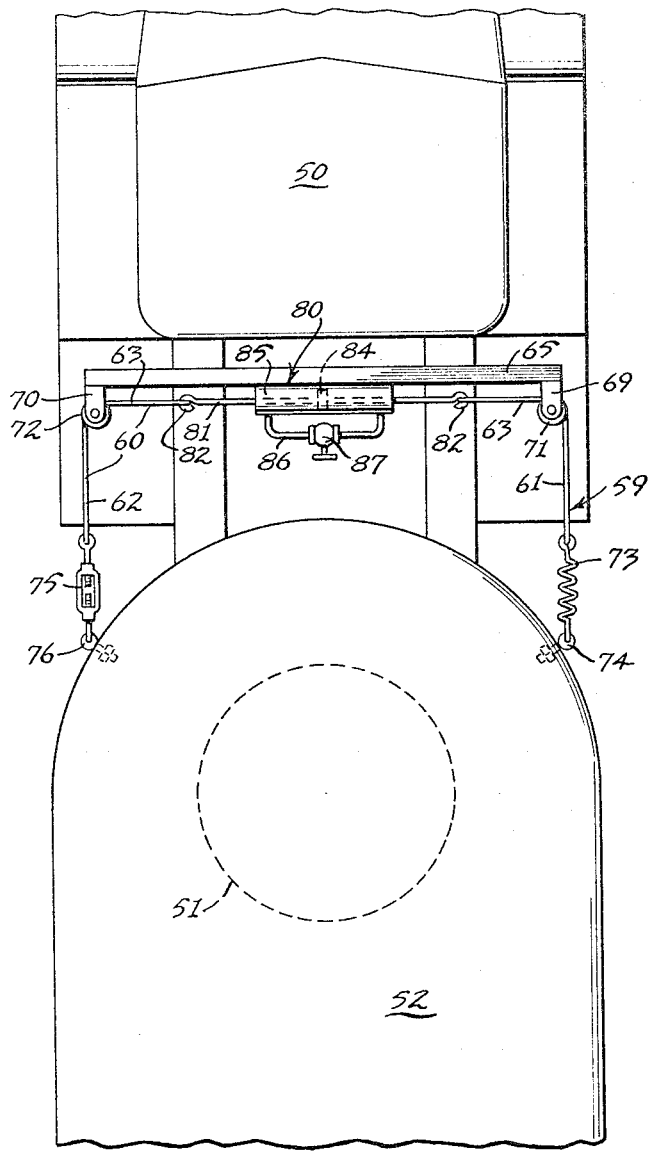
FIG. 5 is a plan view of a trailer stabilizer in operative position connecting a fifth-wheel type tractor to a trailer vehicle, shown fragmentarily, and incorporating the modified cable retarding mechanism of FIG. 4.

Referring now to the drawings in more detail, FIGS. 1 and 2 disclose a tractor vehicle such as the passenger automobile 10, having a rear bumper 11, and a trailer vehicle or trailer 12 having a draft tongue 13 for coupling the trailer 12 to the automobile 10. The draft tongue 13 comprises a pair of converging draw bars 15 and 16 secured at the forward ends by a plate 17 which supports a conventional trailer hitch 18, shown secured to the rear bumper 11. The parts thus far described are old in the art.

The trailer stabilizer 19 made in accordance with this invention preferably includes a flexible lineal member, such as a single cable 20, having a left section or portion 21, a right section or portion 22 and a middle or intermediate section or portion 23. A cable support, such as bar 25, is mounted transversely of the front of the trailer 12, such as by welding or otherwise, to the top of the draw bars 15 and 16, as shown in FIGS. 1 and 2.

Mounted in about the middle of the support bar 25 is a cable retarding mechanism 26. As best disclosed in FIGS. 1 and 3, the retarding mechanism 26 includes an elongated rear clamp bar 27 and an elongated front clamp bar 28 of substantially the same length and shape as the rear clamp bar 27. The opposing faces of both clamp bars 27 and 28 have mating elongated, semi-circular channels 28 and 30 for receiving opposing elongated, arcuate shoes or liners 31 and 32. The clamp shoes 31 and 32 are preferably of a material having a high coefficient of friction, such as asbestos, and have opposed elongated, semi-circular mating seats 33 and 34, the diameters of which will correspond to the diameter of the cable 20 in order to provide a snug fit for receiving the middle cable section 23. As viewed in FIG. 3, the clamp shoes 31 and 32 in closed position form a thick wall cylinder.

The front clamp bar 28 is held in operative position against the rear clamp bar 27, and both clamp bars 28 and 27 are held against the cable support bar 25, by means of four elongated bolts 35 extending through both clamp bars 28 and 27 and into the support bar 25 at opposite ends above and below the clamp shoes 31 and 32. A coil spring 36 is supported about each bolt 35 between the head of the bolt and the front surface of the clamp bar 28 in order to provide a yielding clamping movement between the clamp bars 27 and 28 and the clamp shoes 31 and 32. Moreover, this yieldability of the clamp bars 27 and 28 may be adjusted by turning the threaded bolts 35 in either direction in the support bar 25. The adjustment of bolts 35 also varies the degree of friction between the clamp shoes 31 and 32 and the middle cable section 23.

Mounted on each end of the support bar 25, which substantially spans the width of the trailer 12, is a left cable guide 39 and a right cable guide 40. Each cable guide 39 and 40 includes a pulley 41 and 42, respectively, freely rotatable about vertical axes. The cable 20 extends in opposite directions from the cable retarding mechanism 26 and around the respective pulleys 41 and 42 to become the forwardly extending left and right sections 21 and 22.

The front end of the left cable section 21 is connected to an elongated coil spring 43, which in turn is connected to a bumper coupling or clamp 44. The clamp 44 is secured to the rear bumper 11 in any conventional manner, but preferably at the left extremity of the bumper 11 spaced as far away from the trailer hitch 18 as possible. The front end of the right cable section 22 is preferably connected to a turnbuckle 45, which in turn is connected to a bumper coupling or clamp 46 identical to the clamp 44. The clamp 46 is connected to the rear bumper 11 at its right extremity and is also spaced as far away from the trailer hitch 18 as possible.

In the operation of the invention, after the trailer hitch 18 is coupled to the rear bumper 11, the clamps 44 and 46 are also coupled to the rear bumper 11, preferably at the extremities of the bumper 11 on opposite sides of the trailer hitch 18, so that the left and right cable sections 21 and 22 will be spaced as far apart as possible and as nearly parallel as possible. Before the clamps 44 and 46 are coupled to the bumper 11, the middle section 23 must, of course, be secured between the clamp seats 31 and 32 and the bolts 35 adjusted to effect the desired amount of friction between the cable 20 and the shoes 31 and 32. The opposite ends of the cable 20 pass around the pulleys 41 and 42 to extend forwardly of the trailer 12 and become cable sections 21 and 22. The turnbuckle 45 must, of course, be adjusted to regulate the length of the cable 20 so that the clamps 44 and 46 may be easily secured to the bumper 11, and yet retain the desired amount of tension in the cable 20.

Although the coil spring 43 is shown in the left cable section 21, it may be incorporated in any cable section to make the cable 20 slightly yieldable, and particularly when connecting the clamps 44 and 46 to the bumper 11. The coil spring 43 will also permit sufficient yielding of the stabilizer 19 when the vehicles 10 and 12 suffer abrupt jars and jolts, such as encountered on a rocky or bumpy road, without breaking the cable 20.

One important feature of this invention is the adjustability of the bolts 35 to obtain the right degree of frictional engagement between the clamp shoes 31 and 32 and the middle cable section 23, to resist linear axial movement of the cable 20 for slight turning movements of brief duration of the tractor vehicle 10 relative to the trailer 12. On the other hand, the frictional engagement between the clamp shoes 31 and 32 and the middle cable section 23 must yield to permit linear axial movement of the cable 20 when a positive prolonged turn is made by the tractor vehicle 10, such as a definite left turn from one road to another.

For example, when a definite turn to the left is made by the tractor vehicle 10, the right extremity of the bumper 11 moves away from the right extremity of the trailer 12, thereby relatively moving forward the clamp 46, turnbuckle 45 and the right cable section 22. The resultant tension in the right portion of the middle cable section 23 causes the middle cable section 23 to move toward the right between the clamp shoes 31 and 32. This movement, of course, causes the left cable section 21 to move about the left pulley 41 toward the retarding mechanism 26 as the left side of the tractor vehicle 10 moves rearwardly toward the trailer 12.

In a similar manner, in a right turn movement by the tractor vehicle 10, the middle cable section 23 moves through and between and against the frictional resistance of the clamp shoes 31 and 32 toward the left to lengthen the left cable section 21 and to shorten the right cable section 22.

By virtue of the location of the cable sections 21 and 22 laterally spaced as far away as possible from the center lines of the vehicles 10 and 12 and the trailer hitch 18, as well as the frictional control of the middle cable section 23 by the retarding mechanism 26, the trailer 12 and the tractor vehicle 10 will normally travel in tandem along a substantially straight course almost as a unitary vehicle, without swaying, whipping or tipping. However, when a positive turning movement is made by the tractor vehicle 10 relative to the trainer 12, the stabilizer 19 is adapted to yield to the turning movement, without damage and without upsetting the stability of the trailer.

It will be understood that although a passenger automobile 10 has been discussed as an example of a tractor vehicle, the term "tractor vehicle" includes any type of prime mover; and the trailer vehicle 12 may be any type of trailing vehicle, such as a house trailer, van-type trailer, boat trailer or camping trailer.

FIGS. 4 and 5 disclose a modified form of trailer stabilizer 59, many of the elements of which are similar in construction to those of stabilizer 19. For example, clamps 44 and 46 have been replaced by eye-bolts 74 and 76, respectively, for attachment to opposite sides of a trailer 52. Also the position of the stabilizer 59 is reversed from the position of the stabilizer 19, so that support bar 65 is fixed to and transversely of the tractor 50, having a fifth-wheel 51 for coupling to the trailer 52.

The cable 60, cable sections 61, 62 and 63, cable guides 69 and 70, guide pulleys 71 and 72, coil spring 73 and turnbuckle 75 are substantially the same construction as their corresponding elements in the stabilizer 19.

However, the cable retarding mechanism 80, as best disclosed in FIG. 4, includes a different construction and function for applying resistance to the middle cable section 23. In the cable retarding mechanism 80, a portion of the middle cable section 63 is removed and substituted with an elongated piston rod 81 having hooks 82 at opposite ends for connecting the split sections of the middle cable section 63. Fixed to about the middle portion of the piston rod 81 is a piston 84. The piston rod 81 and piston 84 are adapted to reciprocate within an elongated fluid cylinder 85. Connecting the chambers in the cylinder 85 on opposite sides of the piston 84 is a fluid by-pass line 86 including an adjustment valve 87 for regulating the flow of fluid through the line 86, and consequently between the chambers on opposite sides of the piston 84.

Thus, if the valve 87 is turned toward closed position to permit very limited flow through the by-pass line 86, the resistance to the movement of the piston 84 through the cylinder 85, and consequently to the linear axial movement of the cable section 63 is very great. On the other hand, if the valve 87 is opened to permit increased flow of fluid through the by-pass line 86, the resistance to the movement of the piston 84 through the fluid cylinder 85, and consequently to the linear axial movement of the cable 60, is reduced.

Other than the difference in the construction of the retarding mechanism 80 from the retarding mechanism 26, the function of the two trailer stabilizers 59 and 19 will be substantially similar in maintaining the lateral stability of the tandem vehicles on straight courses, yet permitting positive turning movements in a horizontal plane.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. In a tractor vehicle-trailer vehicle tandem having left and right sides and draft means for coupling said tractor vehicle and trailer vehicle together for horizontal turning movement, a stabilizer comprising:
    (a) a cable having opposite ends and comprising a left section, a right section and a middle section,
    (b) a cable support mounted on one of said vehicles,
    (c) a cable retarding mechanism mounted on said cable support,
    (d) elongated means in said cable retarding mechanism for receiving and engaging said middle section to resist the longitudinal movement of said middle section in either direction through said retarding mechanism,
    (e) a left cable guide mounted on said cable support adjacent said left side for guiding said cable from said retarding mechanism to permit said left section to extend substantially longitudinally between and adjacent the left sides of said vehicles,
    (f) a right guide mounted on said cable support adjacent said right side for guiding said cable from said retarding mechanism to permit said right section to extend substantially longitudinally between and adjacent the right sides of said vehicles,
    (g) left connector means on one end of said cable for securing said left section to the left side of the other of said vehicles,
    (h) right connector means on the opposite end of said cable for securing said right section to the right side of the other of said vehicles.

2. The invention according to claim 1 in which said elongated means for receiving and engaging said middle section comprises a pair of elongated clamp shoes, means supporting said clamp shoes along and on opposite sides of said middle section in frictional engagement with the opposite sides of said middle section.

3. The invention according to claim 2 further comprising adjustable means biasing one of said clamp shoes toward said other clamp shoe.

4. The invention according to claim 1 in which an elongated portion of said middle section comprises a rigid piston rod, a piston fixed on said piston rod, an elongated fluid cylinder through which said piston rod and piston are adapted to be received for operative reciprocable movement, a fluid by-pass line connecting the portions of said cylinder on opposite sides of said piston, and valve means in said by-pass line to adjust the amount of fluid passing therethrough.

References Cited
UNITED STATES PATENTS

| | | | |
|---|---|---|---|
| 2,259,923 | 10/1941 | Byrne et al. | 280—432 |
| 2,565,285 | 8/1951 | Wakeman | 280—432 |
| 2,918,309 | 12/1959 | Cellucci | 280—432 |
| 3,305,246 | 2/1967 | Gonczy et al. | 280—446.3 |
| 3,338,595 | 8/1967 | Bogie | 280—446.3 |

LEO FRIAGLIA, *Primary Examiner.*